C. B. WAGNER, Jr.
TAIL CLIP FOR ANIMALS.
APPLICATION FILED APR. 24, 1915.
1,170,369. Patented Feb. 1, 1916.
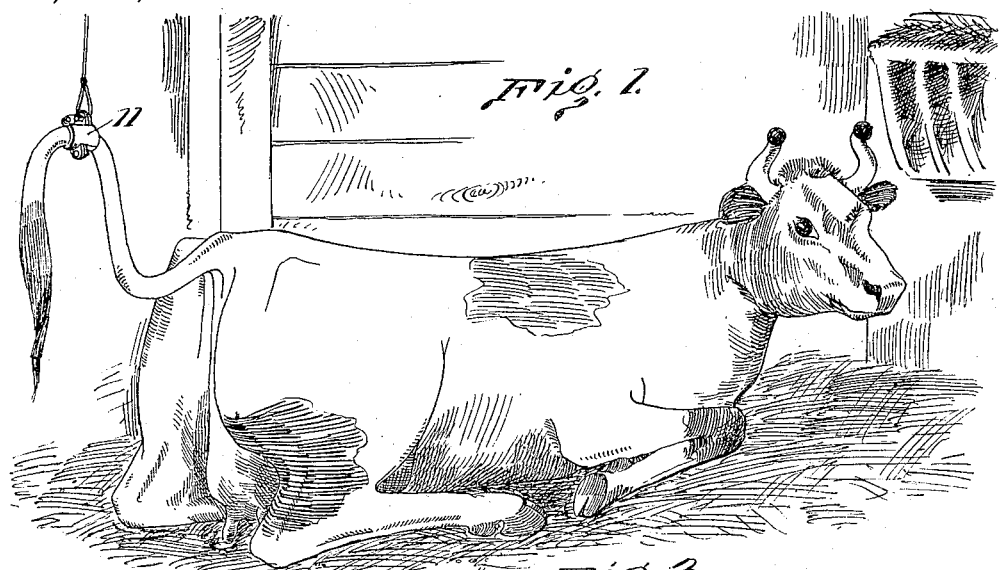
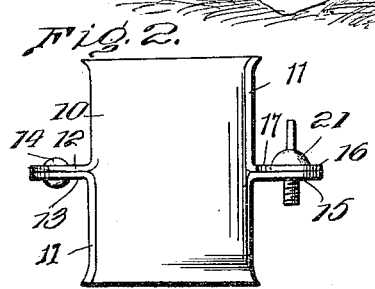
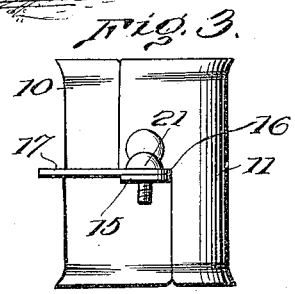
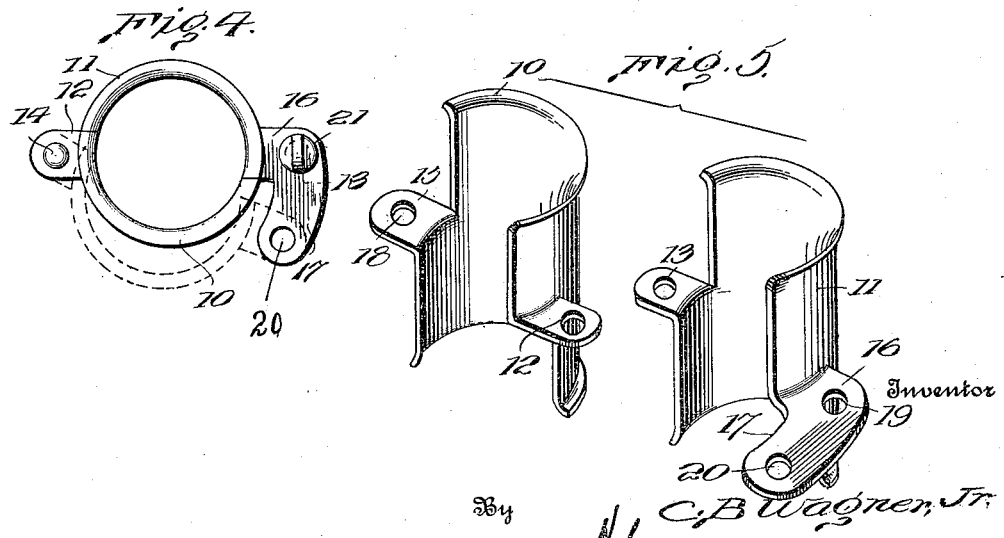

UNITED STATES PATENT OFFICE.

CHARLES B. WAGNER, JR., OF BURLINGTON, WISCONSIN.

TAIL-CLIP FOR ANIMALS.

1,170,369.  Specification of Letters Patent.  Patented Feb. 1, 1916.

Application filed April 24, 1915. Serial No. 23,656.

*To all whom it may concern:*

Be it known that I, CHARLES B. WAGNER, Jr., a citizen of the United States, residing at Burlington, in the county of Racine and State of Wisconsin, have invented certain new and useful Improvements in Tail-Clips for Animals, of which the following is a specification.

This invention relates to devices for holding the tails of cows in elevated position when the animals are at rest, and has for one of its objects to improve the construction and increase the efficiency and utility of a device of this character.

Another object of the invention is to provide a simply constructed device of this character which may be adjusted to increase or decrease its size.

With these and other objects in view, the invention consists in certain novel features of construction as hereinafter shown and described and then specifically pointed out in the claims; and in the drawings illustrative of the preferred embodiment of the invention, Figure 1 is a view of a cow in reclining position with the improvement applied; Fig. 2 is an enlarged elevation of the clip device, viewed from one side; Fig. 3 is an enlarged elevation, viewed at right angles to Fig. 2; Fig. 4 is an enlarged plan view; Fig. 5 are detached and separated perspective views of the co-acting members of the improved device.

The improved device comprises co-acting body portions 10—11, preferably semi-cylindrical. The body portion 10 is formed with a longitudinal cleft, whereby a portion 12 is released and adapted to be bent at right angles to the body to form a bearing. The body 11 is likewise provided with a longitudinal cleft to release a portion 13 which is likewise adapted to be bent at right angles to the body 11. The clefts, whereby the bearings 12—13 are produced, are formed from opposite ends of the respective bodies and the bearings adapted to be overlapped or superimposed and perforated to receive a holding rivet 14. By this arrangement, the parts 10—11 are swingingly united with the wall at one side of the cleft whereby the bearing 13 is produced bearing against the uncleft edge of the member 10, while the wall of the portion defining one side of the cleft whereby the bearing 12 is produced bears against the uncleft edge of the member 11, as shown in Fig. 1.

Another cleft is formed in the body 10 at the side opposite to the bearing 12 whereby another bearing 15 is produced, while another cleft is formed in the body 11 at the side opposite to the bearing 13 whereby a larger bearing 16 is produced having a curved extension 17. The bearing 15 is perforated, as shown at 18, while the bearing 16 is perforated, as shown at 19 and the extension 17 likewise provided with a perforation, shown at 20. When the members 10—11 are swingingly united and disposed in close relation, the bearing 15 will underlap the longer bearing 16—17 with the apertures 18—19 registering to receive a holding member, represented at 21, the member 21 being removable from the apertures. The distance between the bearings 12—13 and the aperture 18 is the same as the distance between the apertures 12—18 and the aperture 20, so that by removing the holding member 21 and swinging the member 11 upon its rivet 14, the apertures 18—20 may be arranged in registering relation to receive the holding member 21. By this means, the members 10—11 may be adjusted to increase or decrease the interior area and adapt the members to structures of varying sizes. The terminals of the members 10—11 will preferably be curved outwardly or flared, as shown, to prevent abrasion of the structure being held between the members.

The improved device is preferably constructed from sheet metal, stamped or pressed into the required shape, and may be constructed of any required size and of any suitable material.

The device may be applied to various purposes, but is designed more particularly to support the tails of cows, as shown in Fig. 1, while the latter are in reclining position. The body portions 10—11 together with their bearings may be constructed of cast or malleable iron, or steel, or other suitable metal or metallic compounds. The device may also be employed for holding the tails of cows in elevated position during the milking operation.

Having thus described the invention, what is claimed as new is:

1. A device of the class described comprising coacting semicylindrical clamping members having lateral bearings intermediate their ends and apertured to receive fastening devices, the material between the bearings and the ends of the clamping members being cut away at opposite sides and toward their opposite ends, whereby when the clamping members are disposed edge to edge, the bearings will be superimposed and the longitudinal division lines between the members broken at opposite sides of the bearings and the gripping force thereby increased.

2. A device of the class described comprising coacting semicylindrical clamping members having lateral bearings intermediate their ends and apertured to receive fastening devices, one of the bearings being extended concentrically of the periphery of the clamping members and the material between the bearings and the ends of the clamping members cut away at opposite sides and toward their opposite ends, whereby the bearings are adapted to be superimposed and the clamping members movable toward and away from each other at one side and the longitudinal division lines between the members broken at opposite sides of the bearings.

In testimony whereof I affix my signature in presence of two witnesses.

CHARLES B. WAGNER, Jr. [L. S.]

Witnesses:
 FRANK H. SCHWALLER,
 NORA B. WAGNER.

Copies of this patent may be obtained for five cents each, by addressing the "Commissioner of Patents, Washington, D. C."